United States Patent Office 3,053,915
Patented Sept. 11, 1962

3,053,915
MANUFACTURE OF ODORLESS PARAFFINIC SOLVENT
Laurence F. King, Mooretown, Lambton, Ontario, Canada, assignor to Esso Research and Engineering Company, a corporation of Delaware
No Drawing. Filed Sept. 23, 1959, Ser. No. 841,677
8 Claims. (Cl. 260—683.9)

This invention relates to a process for hydrogenating olefins which boil predominantly in the range of 300–450° F., using a cobalt molybdate catalyst and conditions for effecting saturation of the olefins with a minimum of undesired side reactions.

A particular object is to effect hydrogenation of a polypropylene fraction, commonly referred to as tetrapropylene or tetramer, of 350–450° F. ASTM boiling range with hydrogen and a cobalt molybdate catalyst under conditions for preparing an odorless solvent which competitively meets requirements and specifications of paraffinic solvents, especially with regard to odor, color, bromine number, and solvency properties.

Although the cobalt molybdate catalyst has been used for hydrofining of various petroleum fractions to accomplish treatments which may involve reactions, such as hydrogenation, dehydrogenation, hydrocracking, and desulfurization, the use of a cobalt molybdate catalyst for obtaining high purity paraffins from polyolefins, such as tetrapropylene (propylene tetramer), under conventional hydrofining conditions was not found satisfactory hitherto on account of tendencies for hydrocracking and polymerization to occur. Under milder hydrofining conditions hydrogenation of the olefins tends to be incomplete. In using more severe conditions of hydrogenation with the cobalt molybdate catalyst, e.g., at temperatures of 650° F., losses occur on account of the side reactions, such as hydrocracking and polymerization. These losses range as high as 75% in yield of desired hydrogenated olefin product at temperatures in the region of 650° F.

It has now been discovered that addition of a minor proportion of a naphthene to the olefin subjected to the hydrogenation with a cobalt molybdate catalyst inhibits the undesired side reactions of cracking and polymerization under the conditions needed for maximizing hydrogenation of the olefins to desired paraffins. For ease of separation from the paraffin product of the naphthene used as an inhibitor, a naphthene, such as cyclohexane, methylcyclopentane, methylcyclohexane, or the like, having a boiling point sufficiently below the initial boiling point of the feed or product is preferably used.

The amount of the naphthene added to the olefin feed may be varied in the range of about 1–50% by volume of the feed depending on such variables as temperature, catalyst activity, space velocity, extent of conversion and required purity of the product and the nature of the feed. As little as 1% by volume of cyclohexane added to the feed shows a marked effectiveness for inhibiting cracking and polymerization. However, best results have been obtained in producing high quality odorless solvent having a bromine number of 2.5 maximum by using 25 vol. percent of cyclohexane in a tetrapropylene feed treated with hydrogen in the presence of cobalt molybdate catalyst at temperatures of 650–700° F.

The commonly available olefins of interest as feeds for the hydrogenation are the polypropylene trimers and tetramers which boil in the range of 300–450° F. These polypropylenes are commercially available and are produced for preparation of detergent alkylates, e.g., alkylated benzene which is then sulfonated. One of the well known methods of producing these olefin polymers uses a phosphoric acid catalyst for polymerizing propylene, such as shown in U.S. Patent 2,695,326. Other known methods may also be used for obtaining olefins of similar boiling range, such as those which employ sulfuric acid or $BF_3$ as a catalyst. The olefins may also be obtained by steam cracking of petrolatum, wax or paraffinic hydrocarbons. In general the olefins which are to be hydrogenated are more stable against cracking if they have less branching. Thus, an olefin feed which has low branching, or a low number of side chains, requires less of the naphthene inhibitor in accomplishing hydrogenation with a cobalt molybdate catalyst. Cobalt molybdate catalyst generally comprises 10–15 wt. percent $MoO_3$ and 2–5 wt. percent CoO on alumina as a support. Variations may be made in the proportions of molybdena and cobalt oxide and in the support. Frequently the cobalt molybdate is represented as having the formula: $CoMoO_4$. The alumina support is adsorptive or activated alumina of known varieties, e.g., eta and gamma phase aluminas. The support may contain other components, such as silica or phosphate.

For the purpose of illustration the following example of hydrogenating tetrapropylene with use of a cobalt molybdate catalyst is given.

EXAMPLE

Feed Preparation

Although various naphtha boiling range olefins are benefited by the hydrogenation method which uses a cracking and polymerizing inhibitor, it was found advantageous to initially prepare an olefin feed having a boiling range of approximately 334–390° F. and preferably 345–385° F. for preparing a high grade solvent. Such a feed was obtained by removing the light trimer ends and the heavy tetramer ends of polypropylene.

Catalyst and Conditions

The cobalt molybdate catalyst was used in the form of ⅛" cylindrical pellets and in the form of 10–20 mesh crushed pellets. Reaction temperatures found suitable were 400–700° F. with pressures of 250–800 p.s.i.g. and feed space velocities of 0.5–10 volumes per volume of catalyst per hour (v./v./hr.). Hydrogen gas was supplied at a rate in the range of 500–2000 standard cubic feet per barrel of olefin feed. These conditions are variable and somewhat interrelated. Inspections of the products showed highest hydrogenation conversion of olefins at 650° F. and a pressure of 800 p.s.i.g. with a space velocity of 1.5 v./v./hr.

Pertinent data on the improvement of product and yields effected by the presence of naphthene in the olefin feed are shown in the following table.

TABLE

*Hydrogenation of Tetrapropylene (368–453° F. ASTM)*

[Conditions: Pressure 250–400 p.s.i.g.]

| Run | Naphthenes in Feed, Vol. Percent | Temp., °F. | Equivalent Space Velocity, V./V./Hr. | Olefin Conversion, Percent | Cracked and Polymerized Material, Approx. Vol. Percent | Yield of Hydrogenated Product, Vol. Percent, Calculated |
|---|---|---|---|---|---|---|
| D | 0 | 650 | 3 | 77 | 52 | 25 |
| E | 1% cyclohexane. | 650 | 3 | 84 | 10 | 74 |
| F | 5% cyclohexane. | 650 | 2 | 84 | 15 | 69 |
| G | 25% cyclohexane. | 650 | 1.5 | 98.5 | 15 | 83 |
| I | 25% cyclohexane. | 700 | 2 | 99 | 15 | 84 |

| Inspections | Feed | Target | Product from Runs | | | | |
|---|---|---|---|---|---|---|---|
| | | | D | E | F | G | I |
| Gravity, °A.P.I. | 50.9 | 53.4 | 55.6 | 53.2 | 53.2 | 53.4 | 53.3 |
| Color, Saybolt | +26 | +30+ | −16 | +30+ | +30+ | +30+ | +30+ |
| Bromine No. | 84 | <2.5 | 20 | 14 | 14 | 1.5 | <1 |

Inspections of the various products show clearly remarkable improvement in product qualities, such as color, low bromine number, gravity, and boiling range by use of the added naphthene side reaction inhibitor. The extent of degradation experienced in the absence of the inhibitor is surprising, since virgin naphtha feeds hydrogenated under the same operating conditions do not indicate the kind of degradation encountered with olefinic feeds.

The product yields at temperatures of 600° F. and 550° F. with lowered space velocities were below 70% when no naphthene inhibitor was added. The low yields were largely due to hydrocracking and polymerization. At higher temperatures, e.g., 700° F., the side reactions were inhibited by added naphthene in amounts of 5–50 vol. percent in the olefin feed so that the cracked and polymerized material amounted to 15 vol. percent or less.

The naphthene was readily removed from the product by stripping, the cyclohexane (B.P. 178° F.) being taken overhead at temperatures of 174° F. to about 195° F.

The hydrogenated products obtained under optimum conditions were found to have low bromine numbers, e.g., below 2.5 maximum, suitable volatility or evaporation properties, e.g., mid-boiling point of 360±5° F., good odor and good color (+30+). The lack of color degradation during the hydrogenation in the presence of the naphthene was a further indication of the effectiveness of the naphthene as an inhibitor of side reactions.

Inspection of a representative good solvent produced by hydrogenating a 334–390° F. ASTM boiling range polypropylene feed with added naphthene inhibitor in the presence of nickel catalyst at 400° F., 800 p.s.i.g., and 2 v./v./hr. include the following significant characteristics. The product had an API gravity of 56.1, flash (Tag) point of 100° F., Kauri-Butanol value of 27, bromine number of 0.4, boiling range of 335–406° F. and evaporation rate of 86 minutes (95% evaporation at 72° F.), a first-rate odor in a blend with 50% alkyd resin, and first-rate color (+30+ Saybolt). An important property of this kind of solvent is its blending value to reduce the viscosity of resins used in paint formulations. In this property it was found to be better than a solvent made from a heavy isobutane-butylene alkylate.

The odor quality of the hydrogenated polypropylene solvent made in a continuous unit was generally good, but when the odor was found not as good as desired, it was found to be readily corrected by a finishing treatment, such as by zeolite, clay, and other adsorbents.

In testing feeds made at various refineries, it was found that some of the feeds are more refractory than others toward the desired selective hydrogenation of the olefins, but that in these instances the cobalt molybdate catalyst can be used with the naphthene inhibitor in stages. A particularly suitable method of hydrogenation in two stages employs the cobalt molybdate catalyst under mild conditions in a first stage and a nickel catalyst in a second stage. For example, in an initial stage the refractory olefin feed with added naphthene inhibitor was treated with hydrogen in the presence of cobalt molybdate catalyst at 600° F., 800 p.s.i.g., 2 v./v./hr. and hydrogen at the rate of 500 equivalent s.c.f./bbl. until the bromine number was lowered to 7 after which the product from the first stage was treated with nickel at 500° F., 800 p.s.i.g., 5 v./v./hr. until the bromine number was lowered to 2.3 to obtain a good quality product.

The hydrogenated product may be rerun, e.g., in a vacuum distillation, to adjust its volatility and obtain further improvement in its qualities.

Although a principal object is to use the present invention for making improved odorless paraffinic solvents it can be used beneficially for converting a single $C_{7+}$ olefin or mixed olefins boiling in the range of about 200–450° F. to paraffins through the hydrogenation of the ethylenic linkage. In any instance, the hydrogenating conditions and the catalyst are selected to obtain a high conversion to paraffins with a minimum of side reactions, such as cracking, polymerization or dehydrogenation with the aid of the added naphthene inhibitor. In general, the hydrogen pressures need not be higher than those indicated but at the relatively higher hydrogen pressures the hydrogenation is faster for a given temperature.

The invention described is claimed as follows:

1. A process for the hydrogenation of monoolefins to form paraffins therefrom with a minimum of undesired side reactions which comprise charging a monoolefinic feed stock boiling in the range of from 300 to 450° F. and added gaseous hydrogen to an active hydrogenation catalyst maintained at active hydrogenation conditions of temperatures below 700° F. and superatmospheric pressures to effect the hydrogenation of the monoolefins and adding to said monoolefinic feed stock about 1–50% by volume of the feed of a naphthene boiling below the initial boiling point of the desired paraffinic product thereby inhibiting side reactions of cracking and polymerization during said hydrogenation and separating the unaltered naphthenes from the hydrogenated product by distillation.

2. A process for the preparation of odorless solvents which comprises catalytically polymerizing propylene, separating a polypropylene fraction boiling in the range of from 300–450° F. from the polymerization product by distillation, charging said polypropylene fraction and added gaseous hydrogen to an active hydrogenation catalyst maintained at active hydrogenation conditions of temperatures below 700° F. and superatmospheric pressure to effect the saturation of said polypropylene fraction and adding to said polypropylene fraction about 1–50% by volume of the feed of a naphthene boiling below the initial boiling point of the polypropylene fraction thereby inhibiting side reactions of cracking and polymerization during said hydrogenation and separating unaltered naphthenes from the hydrogenated product by distillation.

3. The process as defined in claim 2 in which the hydrogenation catalyst is a cobalt oxide-molybdenum oxide type catalyst and the hydrogenation is effected at about 400–700° F. and at a pressure of about 200–800 p.s.i.g.

4. The process as defined in claim 2 in which the polypropylene feed fraction boils in the range of from 345–385° F., the hydrogenation catalyst is a cobalt oxide-molybdenum oxide type catalyst, the hydrogenation is effected at about 400–700° F., a pressure of 200–800 p.s.i.g. and at a space velocity of about 0.5 to 4.0 volumes of liquid feed per volume of catalyst per hour.

5. The process as defined in claim 4 in which the naphthene added to the polypropylene feed is cyclohexane and is added in amounts of from 5 to 25% dry volume based on the polypropylene feed.

6. The process for the preparation of odorless solvents which comprises catalytically polymerizing propylene, separating a polypropylene fraction boiling in the range of from 300 to 450° F. from the polymerization product by distillation, adding about 1 to 50% by volume of a naphthene boiling below the initial boiling point of said polypropylene fraction thereto in order to inhibit side reactions of cracking and polymerization during the hydrogenation of the polypropylene fraction, charging the resultant mixture and added gaseous hydrogen to a first reaction zone containing an active cobalt oxide-molybdenum oxide hydrogenation catalyst maintained at active hydrogenation conditions of temperature and pressure to effect substantial saturation of said polypropylene fraction, passing the reaction mixture from said first reaction zone to a second reaction zone containing an active nickel hydrogenation catalyst maintained at active hydrogenation conditions of temperature and pressure in order to complete the saturation of said polypropylene fraction and separating the unaltered naphthenes from the hydrogenated polypropylene product by distillation.

7. The process as defined in claim 6 in which the polypropylene fraction boils in the range of from 345–385° F., the temperature is about 600° F. and the space velocity is about 2 v./v./hr. in the first reaction zone and the temperature is about 500° F. and the space velocity is about 5 v./v./hr. in the second reaction zone.

8. The process as defined in claim 7 in which the naphthene is cyclohexane and is added in amounts of from 5 to 25 vol. percent based on the polypropylene feed.

References Cited in the file of this patent

UNITED STATES PATENTS

| | | |
|---|---|---|
| 2,416,894 | Barron | Mar. 4, 1947 |
| 2,417,308 | Lee | Mar. 11, 1947 |
| 2,417,872 | Hill et al. | Mar. 25, 1947 |
| 2,420,030 | Brandon | May 6, 1947 |
| 2,438,421 | Sensel et al. | Mar. 23, 1948 |
| 2,472,254 | Johnson | June 7, 1949 |
| 2,626,286 | Voorhies et al. | Jan. 20, 1953 |
| 2,640,802 | Porter et al. | June 2, 1953 |
| 2,883,336 | Sweetser et al. | Apr. 21, 1959 |